(12) United States Patent
Werner et al.

(10) Patent No.: US 8,276,964 B2
(45) Date of Patent: Oct. 2, 2012

(54) CONSOLE OF A MOTOR VEHICLE HAVING A CONTAINER FOR RECEIVING AN OBJECT

(75) Inventors: Jochen Werner, Wiesbaden (DE); Hassan Mir, Mainz (DE); Alexander Leicht, Renningen (DE)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 12/821,979

(22) Filed: Jun. 23, 2010

(65) Prior Publication Data

US 2011/0095556 A1  Apr. 28, 2011

(30) Foreign Application Priority Data

Jun. 26, 2009 (DE) .................... 10 2009 030 577

(51) Int. Cl.
 *B60R 13/00* (2006.01)
(52) U.S. Cl. .................... 296/24.34; 296/37.14; 224/926
(58) Field of Classification Search ............... 296/24.34, 296/37.8; 224/926; 248/311.2, 685
See application file for complete search history.

(56) References Cited

U.S. PATENT DOCUMENTS

| | | | | |
|---|---|---|---|---|
| 5,085,481 A * | 2/1992 | Fluharty et al. | ............... | 296/37.8 |
| 5,246,151 A * | 9/1993 | Jabara | ......................... | 224/42.38 |
| 5,509,633 A * | 4/1996 | Ruster et al. | ............... | 248/311.2 |
| 5,865,411 A | 2/1999 | Droste et al. | | |
| 6,059,243 A | 5/2000 | Hikage et al. | | |
| 6,749,167 B2 | 6/2004 | Kaupp et al. | | |
| 6,817,584 B2 | 11/2004 | Ogura | | |
| 6,915,997 B2 | 7/2005 | Nakaya | | |
| 7,322,500 B2 * | 1/2008 | Maierholzner | ............... | 224/926 |
| 7,413,154 B2 * | 8/2008 | Harshman et al. | ......... | 248/311.2 |
| 7,566,040 B2 * | 7/2009 | Lota | ........................... | 248/311.2 |
| 7,861,993 B2 * | 1/2011 | Hansen et al. | ............. | 248/311.2 |
| 2002/0179796 A1 | 12/2002 | Kaupp et al. | | |
| 2003/0155476 A1 | 8/2003 | Nakaya | | |
| 2004/0129747 A1 | 7/2004 | Maierholzner | | |
| 2006/0278790 A1 | 12/2006 | Park | | |

FOREIGN PATENT DOCUMENTS

| | | |
|---|---|---|
| DE | 4432036 A1 | 3/1995 |
| DE | 19529876 A1 | 2/1997 |
| DE | 19609022 A1 | 9/1997 |
| DE | 19633913 A1 | 2/1998 |
| DE | 19724599 A1 | 6/1998 |

(Continued)

OTHER PUBLICATIONS

German Patent Office, German Search Report for German Application No. 102009030577.7, Nov. 2, 2009.

(Continued)

*Primary Examiner* — Lori Lyjak
(74) *Attorney, Agent, or Firm* — Ingrassia Fisher & Lorenz, P.C.

(57) ABSTRACT

A console of a motor vehicle, in particular a central console of a motor vehicle, is provided that has a container, which has a receptacle space, which is open on top, for at least one object, and having an apparatus for lateral positioning of the at least one object, the container having a floor and side walls. The console is provided with an apparatus for lateral positioning that has a frame part, which is detachably connectable to the side walls in the area of the opening of the receptacle space and positioning elements mounted in the frame part.

20 Claims, 2 Drawing Sheets

FOREIGN PATENT DOCUMENTS

| | | |
|---|---|---|
| DE | 20108250 A1 | 9/2002 |
| DE | 20108250 U1 | 9/2002 |
| DE | 10134027 A1 | 1/2003 |
| DE | 10257747 A1 | 9/2004 |
| DE | 20308296 U1 | 10/2004 |
| DE | 202004019209 U1 | 3/2005 |
| DE | 202005010253 U1 | 9/2005 |
| DE | 102004060269 A1 | 6/2006 |
| DE | 102005019485 A1 | 11/2006 |
| DE | 202006013840 U1 | 11/2006 |
| DE | 102005057330 A1 | 6/2007 |
| DE | 602004009471 T2 | 7/2008 |
| GB | 2310791 A | 9/1997 |
| GB | 2460921 A | 12/2009 |
| JP | 9052551 A | 2/1997 |
| JP | 10291436 A | 11/1998 |

OTHER PUBLICATIONS

German Patent Office, German Office Action for German Application No. 102009030577.7, Apr. 9, 2009.

British Patent Office, British Search Report for British Application No. 1007222.1, Aug. 19, 2010.

* cited by examiner

CONSOLE OF A MOTOR VEHICLE HAVING A CONTAINER FOR RECEIVING AN OBJECT

CROSS-REFERENCE TO RELATED APPLICATION

This application claims priority to German Patent Application No. 102009030577.7, filed Jun. 26, 2009, which is incorporated herein by reference in its entirety.

TECHNICAL FIELD

The invention relates to a console of a motor vehicle, in particular a central console of a motor vehicle, having a container which has a receptacle space, which is open on top, for receiving at least one object, and having an apparatus for lateral positioning of the at least one object, the container having a floor and side walls.

BACKGROUND

Consoles of this type are known in greatly varying designs from the prior art. The container is used for receiving greatly varying objects, in particular beverage containers, such as cans, bottles, and cups. The apparatus for lateral positioning ensures that the particular object is securely held in the container while traveling and thus during the effects of acceleration and braking forces and laterally acting forces. The container is delimited on the bottom by the floor and laterally by the side walls. The container is open on top. When the object is inserted into the container, it stands on the floor of the container.

A central console of a motor vehicle that is provided with a recess for receiving a container is described in DE 101 34 027 A1. A module having the container forms the apparatus for lateral positioning of the at least one object. The receptacle space of the container is oval in form. The apparatus for lateral positioning of the object is implemented as a rotatable compartment divider, which has a cylindrical wall extending over a part of the circumference, which can be moved into the receptacle space by rotating the compartment divider so that it partitions off an approximately cylindrical placement area for the placement of a beverage can, for example.

The described central console has the disadvantage that the apparatus for lateral positioning of the object and the container permanently represent a modular unit and accordingly cannot be functionally separated. This modular unit has a complex design and there is no possibility of reducing the functionality of the container exclusively in such a manner that the container is only used for receiving one or more objects, without lateral positioning occurring.

A container having a receptacle space, which is open on top, for receiving at least one object and having an apparatus for lateral positioning of the object is also known from DE 203 08 296 U1. The container and the apparatus for lateral positioning also form a non-separable module having the above-described disadvantages therein.

A container for receiving at least one object and an apparatus for lateral positioning of the object, which works together therewith like a modular unit, is also described in DE 197 24 599 A1. This apparatus has spring webs or spring clips, which act radially on the object implemented as a drinking vessel.

At least one object of the present invention is to provide a console of a motor vehicle, in which precise positioning of the object and the greatest possible flexibility of the console are ensured with a simple structural design. In addition, other objects, desirable features and characteristic will become apparent from the subsequent summary and detailed description, and the appended claims, taken in conjunction with the accompanying drawings and this background.

SUMMARY

The at least one object, other objects, desirable features and characteristics are achieved in the case of a console having the features of the type cited at the beginning in that the apparatus for lateral positioning has a frame part, which is detachably connectable to the side walls in the area of the opening of the receptacle space, and positioning elements mounted in the frame part.

If the apparatus for lateral positioning is detached from the container and thus removed therefrom, the container is completely available for receiving the at least one object. The receptacle space of the container is thus not restricted in cross-section in its upper, open area by the apparatus for lateral positioning. It is especially advantageous in particular if the receptacle space of the container has an essentially cuboid form, having a floor situated horizontally in relation to a horizontal motor vehicle and side walls situated perpendicularly thereto. For example, a large, vertically situated book, or multiple smaller objects may find space in this large, cuboid receptacle space that is open on top. The apparatus for lateral positioning of the object, which is connected to the container, is preferably only used when an object that receives a liquid, in particular a beverage, is to be mounted against tilting.

The container can be designed as a separate component that is inserted from above into a recess of the console. It is also conceivable to design the console directly so that it has a recess, the floor and the walls of the console forming the floor and the side walls of the container.

The detachable connection of the frame part of the apparatus for lateral positioning of the at least one object and the side walls of the container can be performed in various ways. It is viewed as especially advantageous if the frame part is connectable to the container using a plug connection and/or a catch connection. A combined connection using plug connection and catch connection has the special advantage that because of the plug connection, a grip from the rear of the frame part can be produced in the container, for example, while the catch connection is produced at a distance from this plug connection between the frame part and the container. The catch connection then ensures that the frame part can only be separated from the container when it is actively desired, and thus the apparatus for lateral positioning of the at least one object can only be intentionally detached from the container.

According to a concrete structural design, it is provided under this aspect that the frame part has at least one fixed projection for insertion into a recess of the container in the area of one end and has at least one retractable and extensible projection for insertion into another recess of the container in the area of the end facing away from the first end. Upon extension of this projection, it preferably engages with the container, specifically a side wall of the container. The design allows a particularly simple embodiment of the frame part and a mounting in the side walls of the container. The movable projection is preferably retractable against a restoring force. Under the action of the restoring force, the movable projection thus engages behind the recess of the container and ensures the connection between frame part and container.

A rectangular design, which forms an essentially rectangular opening in the frame part, while size and cross-sectional shape essentially correspond to those of the opening of the receptacle space of the container, is viewed as a preferred geometric design of the frame part. The open cross-section of the receptacle part is at most insignificantly reduced by the frame part in this way, so that objects having a relatively large cross-section may be received by the container and positioned using the apparatus.

It is viewed as particularly advantageous if the container is designed so that it not only has the floor, but rather also an intermediate floor which can be situated parallel thereto. The advantage of this intermediate floor is that a partial receptacle space of the container is formed between it and the floor of the container, which can be used for receiving smaller objects, for example, a key case having keys or a pair of spectacles. In contrast, the intermediate floor is used for storing at least one smaller object, such as a drinking cup. If the apparatus for lateral positioning is additionally connected to the container, the drinking cup is additionally laterally positioned.

According to a special design, it is provided under this aspect that at least one foldable plate-shaped support is mounted in the container, which is situated parallel and at a distance from the floor in a first fixed position and is situated directed upward and adjacent to one of the side walls in a second position. This foldable plate-shaped support thus represents an intermediate floor in its first fixed position. In the second position, the intermediate floor is collapsed and only requires a small installation space. The collapsed intermediate floor is situated adjacent to one of the side walls in this case, so that a relatively large receptacle space is still available for objects in the container, which may then be placed on the floor of the container.

According to a preferred refinement of the invention, it is provided that the foldable support has two support parts, the two support parts being pivotably connected to one another using a joint and the two support parts being collapsed in the second position of the support.

The positioning elements received by the frame part may be designed in greatly varying ways or mounted in the frame part in greatly varying ways, in order to achieve the purpose of lateral positioning of the at least one object. The positioning elements are thus implemented as elastic and/or mounted so they are yielding in the frame part, for example. In the case of elastic implementation of the positioning elements, they may be fixedly connected to the frame part. Under the effect of the particular object that is inserted into the receptacle space of the container, upon contact of the object and the elastic positioning element, the positioning element deforms either in the insertion direction of the object or perpendicular thereto. If the positioning element is mounted so it is yielding in the frame part, for example, against the force of a spring, the insertion of the object into the receptacle space and the contacting of object and positioning elements results in the movement opposite to the spring force. The particular positioning element is thus mounted so it is pivotable downward in the frame part or is mounted so it is movable in the opening plane of the frame part. The adjustment of the positioning element occurs in particular against spring force.

The positioning elements are particularly implemented as strips. This design allows particularly simple receiving and mounting of the positioning elements in the frame part. In particular, the frame part has grooved areas for receiving the positioning elements or the strips in this case.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
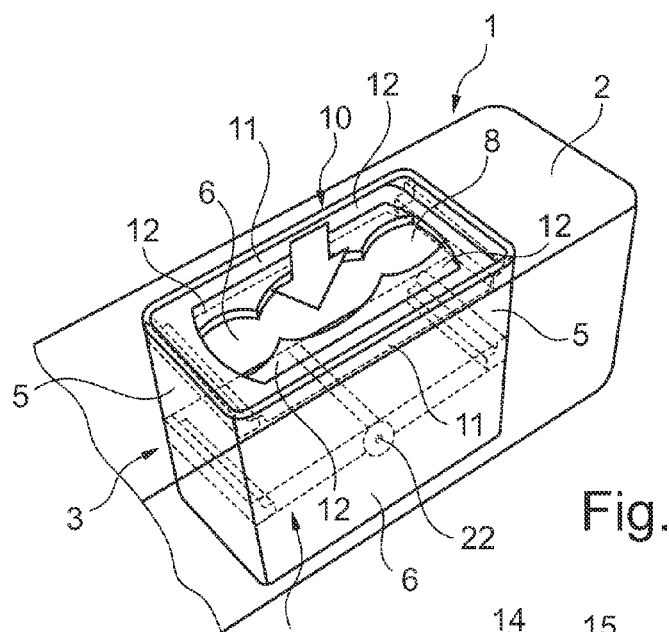
FIG. 1 shows a spatial view of the central console of a motor vehicle designed according to an embodiment of the invention with the apparatus for lateral positioning of the at least one object connected to the container.
Figure 2:
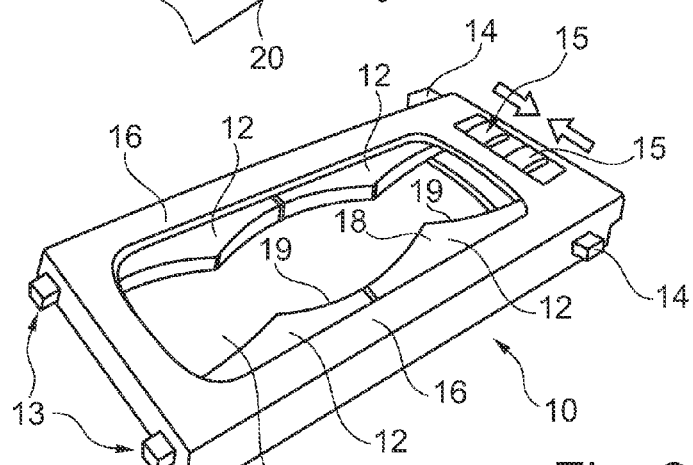
FIG. 2 shows a spatial view of the apparatus for lateral positioning of the at least one object.

The following detailed description is merely exemplary in nature and is not intended to limit application and uses. Furthermore, there is no intention to be bound by any theory presented in the preceding background or summary or the following detailed description.

A central console 1 of a motor vehicle has a console section 2, which is provided with a recess, into which a container 3 is inserted from above. This container has a horizontally situated floor in relation to the horizontal position of the motor vehicle and four side walls extending upward therefrom, which are designated hereafter as transverse walls 5 and longitudinal walls 6. The longitudinal walls 6 are situated parallel to one another and oriented perpendicular to the floor 4. The two transverse walls 5 are situated perpendicular to the longitudinal walls 6.

In the area of one upper end, the container 3 has an outwardly directed peripheral projection 7, in the area of which the container 3 rests on the console section 2. A receptacle space 8, which is open on top, is formed inside the container 3. In the area of the upper end of the receptacle space 8, and thus adjacent to the peripheral projection 7, strips 9 are connected to the transverse walls 5, which are used for mounting an apparatus 10 for lateral positioning of at least one object to be received by the container 3. This apparatus 10 has a frame part 11, which is detachably connectable to the strips 9 and thus the side parts in the form of the transverse walls 5, and positioning elements 12 mounted in the frame part 11. The frame part 11 is designed as a rectangular frame, the frame part 11 resting on the strips 9 in a position connected to the container 3. The frame part 11 has two fixed projections 13 in the area of one end for insertion into recesses (not shown) of the strip 9 associated therewith. In the area of the end facing away, the frame part 11 is provided with two retractable and extensible projections 14, which are insertable into recesses (also not shown) of the two longitudinal walls 6 adjacent to the other strip 9. Using two sliding parts 15, which are each fixedly connected to one of the projections 14, the projections 14 may be moved toward one another against the force of a spring (not shown) and thus disengaged from the associated recesses in the longitudinal walls to detach the catch connection between frame part 11 and container 3. To connect the frame part 11 to the container 3, it is thus only necessary to insert the two projections 13 into one strip 9 and then move the projections 14 toward one another by actuating the sliding parts 15, pivot the frame part 11 into position in relation to the container 3, and then release the sliding parts 15, whereby the projections 14 engage in the recesses in the longitudinal walls 6 under the effect of the spring force, the recesses being oriented perpendicular to the longitudinal walls 6.

The frame part 11 essentially has the form of a rectangular ring part, corresponding to the rectangular shape of the container 3 in the area of the upper opening. The size and the cross-sectional shape of the frame part 11 essentially correspond in this case to those of the opening of the receptacle space 8. In the area of each of the two longitudinal webs of the frame part 11, it receives the positioning elements 12, which are implemented as strips, in grooved areas of the longitudinal webs 16 facing toward one another. Two strips 12 are provided for each longitudinal web 16, which are made of elastic material and are inserted into the particular groove of the longitudinal web 16 and are fixedly connected to the longitudinal web 16. The particular strip 12 protrudes into the opening formed by the frame part 11 and has an elevated middle area 18 and areas 19 sloping down therefrom in relation to its longitudinal extension. The particular strips 12 are thus implemented identically. Because of the contouring of the strips 12 thus formed in their area facing toward the opening, a receptacle opening for one or two objects, which is or are held laterally by the strips 12, is formed between strips 12 of different longitudinal webs 16.

Figure 3:
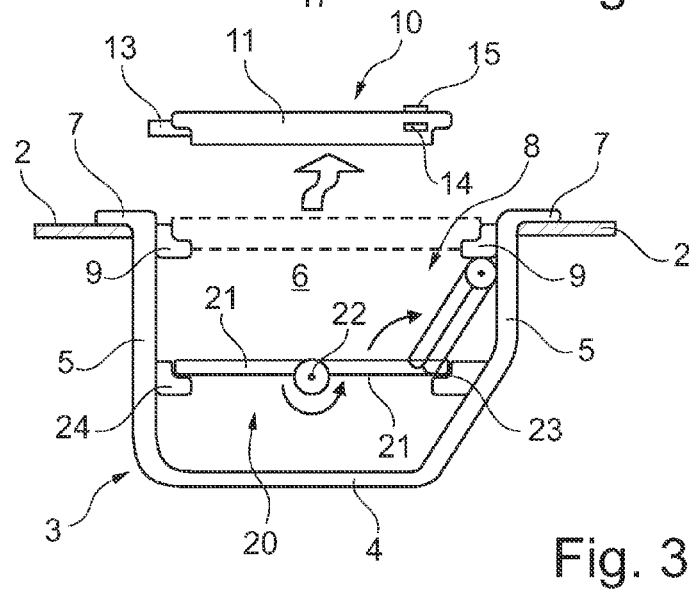
FIG. 3 shows a longitudinal central section through the container and the apparatus for lateral positioning of the at least one object, which is separated therefrom; and FIG. 4 through FIG. 6 shows various functional states of the console according to embodiments of the invention.

Finally, the container 3 has an intermediate floor 20 which is transferable into an active position. It is designed as a foldable plate-shape support, which is situated parallel and at a distance to the floor 4 in a first, fixed position and is situated directed upward and adjacent to one of the transverse walls 5 in a second position. Specifically, the intermediate floor 20 has two support parts 21, which are pivotably connected to one another using a joint 22. The two support parts 21 are collapsed in the second position of the intermediate floor 20 and contact one another flatly. Both positions of the intermediate floor 20 are illustrated in FIG. 3. In the functional position, the intermediate floor 20, which is pivotably mounted in the area of one end using a joint 23 in one transverse wall 5, rests at its end away from the joint on a strip 24 connected to the container 3. In the other collapsed position of the intermediate floor 20, it is positioned below the strip 9, which is located above the joint 23.

Figure 4:
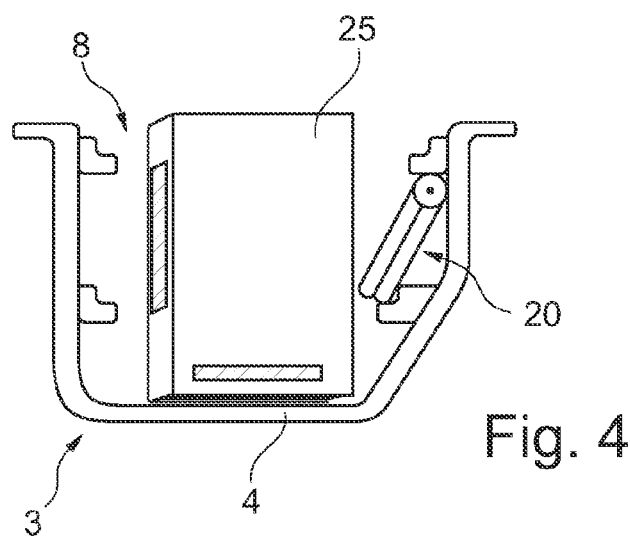

FIG. 4 shows the container 3 with the apparatus 10 for lateral positioning of the at least one object removed therefrom and intermediate floor 20 located in the collapsed position. In this functional state, a particularly large receptacle space 8 results, which is outstandingly suitable for receiving a large object 25 in the container 3, the object 25 shown being a book, which is placed vertically into the container 3, rests on the floor 4, and protrudes slightly out of the container 3 on top.

Figure 5:
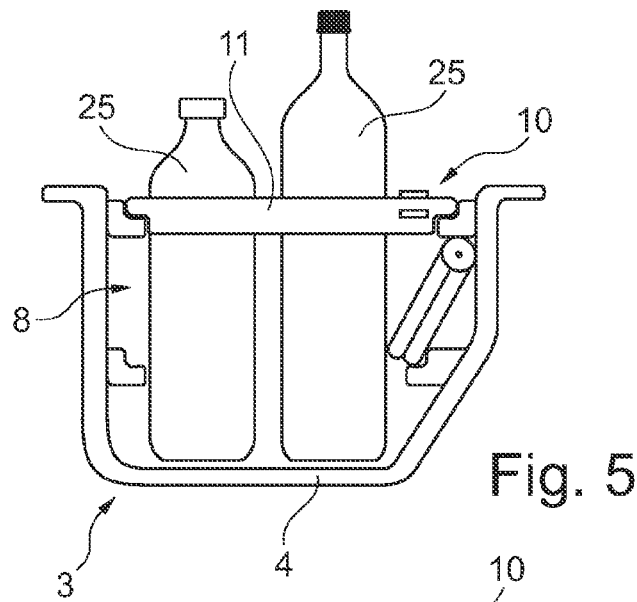

FIG. 5 shows another functional state, in which the apparatus 10 for lateral positioning of the at least one object is connected to the container 3. The container 3 receives two relatively large objects 25, which are bottles. The objects 25 stand on the floor 4 of the container 3 and protrude beyond the frame part 11. The two objects 25 are laterally positioned by the strips 12, which are mounted in the frame part 11. In this embodiment, the intermediate floor 20 is located in its collapsed position, in order to thus provide the largest possible receptacle space 8 inside the container for the two objects 25.

Figure 6:
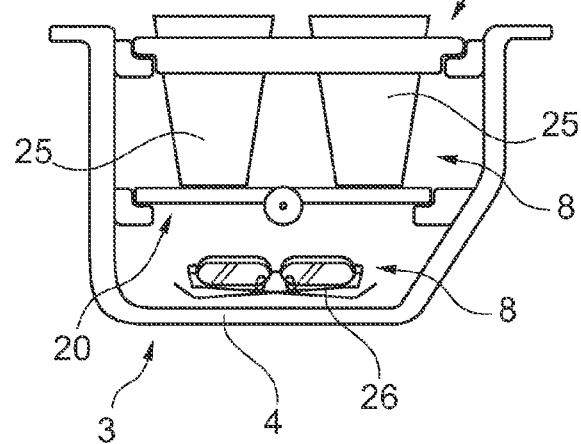

In the embodiment according to FIG. 6, the apparatus 10 is also connected to the container 3, but the intermediate floor 20 is located in its functional position parallel to the floor 4 of the container 3. A lower area of the receptacle space 8 is thus formed between the floor 4 and the intermediate floor 20, which can be used for receiving a smaller object 26, such as the pair of spectacles shown. An area of the receptacle space 8 which only has a small vertical dimension thus remains above the intermediate floor 20. In this case, the intermediate floor 20 receives two objects 25, which are drinking cups, which protrude beyond the frame part 11 and are laterally positioned using the strips 12 mounted in the frame part 11.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A console of a motor vehicle, comprising a container having a receptacle space with an opening for at least one object, a floor, and side walls;
   an apparatus for lateral positioning of the at least one object, having a frame part that is detachably connectable to the side walls in an area of the opening and having positioning elements mounted in the frame part, wherein the frame part has at least one fixed projection for insertion into a recess of the container in the area of one end and has at least one retractable and extensible projection for insertion into another recess of the container in the area of an end facing away from a first end.

2. The console of the motor vehicle of claim 1, wherein the console is a central console.

3. The console according to claim 1, wherein the container is a separate module that is insertable into the receptacle space of a console main part of the console.

4. The console according to claim 1, wherein the container is adapted to form an essentially cuboid receptacle space.

5. The console according to claim 1, wherein the frame part is connectable to the container using a catch connection.

6. The console according to claim 1, wherein a movable projection is retractable against a restoring force.

7. The console according to claim 1, wherein the frame part is rectangular and has an essentially rectangular opening with a size and a cross-sectional shape that essentially corresponds to that of the opening of the receptacle space.

8. A console of a motor vehicle, comprising a container having a receptacle space with an opening for at least one object, a floor, and side walls;
   an apparatus for lateral positioning of the at least one object, having a frame part that is detachably connectable to the side walls in an area of the opening and having positioning elements mounted in the frame part; and
   at least one foldable plate-shaped support mounted in the container, which is situated parallel and at a distance to the floor in a first fixed position and is situated directed upward and adjacent to one of the side walls in a second position, wherein the at least one foldable plate-shaped support has two support parts, the two support parts pivotably connected to one another using a joint and the two support parts collapsed in the second position.

9. The console according to claim 1, wherein the positioning elements are implemented as elastic.

10. The console according to claim 1, wherein the positioning elements are mounted in order to yield in the frame part.

11. The console according to claim 1, wherein the positioning elements are mounted in order to pivot downward in the frame part.

12. The console according to claim 1, wherein the positioning elements are mounted in order to move in an opening plane of the frame part.

13. A console of a motor vehicle, comprising a container having a receptacle space with an opening for at least one object, a floor, and side walls;

an apparatus for lateral positioning of the at least one object, having a frame part that is detachably connectable to the side walls in an area of the opening and having positioning elements mounted in the frame part;

wherein the positioning elements are implemented as strips.

14. The console according to claim 1, wherein the positioning elements, on a side facing toward the opening in the frame part, has at least one front face area directed away from the opening.

15. The console according to claim 1, wherein at least one foldable plate-shaped support is mounted in the container, which is situated parallel and at a distance to the floor in a first fixed position and is situated directed upward and adjacent to one of the side walls in a second position.

16. The console according to claim 15, wherein the at least one foldable plate-shaped support has two support parts, the two support parts pivotably connected to one another using a joint and the two support parts collapsed in the second position.

17. The console according to claim 8, wherein the container is a separate module that is insertable into the receptacle space of a console main part of the console.

18. The console according to claim 8, wherein the positioning elements are mounted in order to yield in the frame part.

19. The console according to claim 13, wherein the container is a separate module that is insertable into the receptacle space of a console main part of the console.

20. The console according to claim 13, wherein the positioning elements are mounted in order to yield in the frame part.

* * * * *